United States Patent
Nakamura et al.

(10) Patent No.: US 8,091,685 B2
(45) Date of Patent: Jan. 10, 2012

(54) SOUND ABSORBING STRUCTURE BUILT INTO LUGGAGE COMPARTMENT OF VEHICLE

(75) Inventors: Yasutaka Nakamura, Hamamatsu (JP); Rento Tanase, Iwata (JP); Atsushi Yoshida, Hamamatsu (JP); Masaru Matsushita, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 0 days.

(21) Appl. No.: 12/573,529

(22) Filed: Oct. 5, 2009

(65) Prior Publication Data

US 2010/0089691 A1  Apr. 15, 2010

(30) Foreign Application Priority Data

Oct. 7, 2008  (JP) .................. 2008-261015

(51) Int. Cl.
*E04B 1/82*  (2006.01)
(52) U.S. Cl. .......... 181/286; 181/284; 181/290; 52/144; 52/145; 296/211
(58) Field of Classification Search .................. 181/286, 181/284; 296/211
See application file for complete search history.

(56) References Cited

U.S. PATENT DOCUMENTS

| | | | | | |
|---|---|---|---|---|---|
| 5,457,291 | A | * | 10/1995 | Richardson | 181/293 |
| 5,509,247 | A | * | 4/1996 | Fortez et al. | 52/630 |
| 5,554,830 | A | * | 9/1996 | Muller et al. | 181/290 |
| 5,959,264 | A | * | 9/1999 | Bruck et al. | 181/286 |
| 5,959,265 | A | * | 9/1999 | Van Ligten | 181/286 |
| 6,305,494 | B1 | * | 10/2001 | Pfaffelhuber et al. | 181/286 |
| 6,568,135 | B1 | * | 5/2003 | Yokoyama et al. | 52/145 |
| 7,308,965 | B2 | * | 12/2007 | Sapoval et al. | 181/210 |
| 2005/0194209 | A1 | * | 9/2005 | Yang et al. | 181/286 |
| 2008/0128201 | A1 | * | 6/2008 | Yamaguchi et al. | 181/286 |
| 2009/0000864 | A1 | * | 1/2009 | Schnitta | 181/286 |

FOREIGN PATENT DOCUMENTS

| | | |
|---|---|---|
| JP | 11-099869 A | 4/1999 |
| JP | 2004-009312 A | 1/2004 |
| JP | 3836402 B2 | 10/2006 |

* cited by examiner

Primary Examiner — Forrest M Phillips
(74) Attorney, Agent, or Firm — Dickstein Shapiro LLP

(57) ABSTRACT

A sound absorbing structure is constituted of a vibration plate and a rear air layer and is installed in a luggage compartment or trunk which is separated from a cabin in a vehicle. Sound waves entering into the luggage compartment drive the vibration plate to vibrate so that acoustic energy is converted into mechanical energy and is consumed by way of vibration of the vibration plate. By appropriately setting parameters and dimensions, the sound absorbing structure efficiently absorbs low-frequency sound such as road noise occurring due to friction of wheels of the vehicle traveling on a road.

12 Claims, 8 Drawing Sheets

SOUND ABSORBING STRUCTURE BUILT INTO LUGGAGE COMPARTMENT OF VEHICLE

BACKGROUND OF THE INVENTION

1. Field of the Invention

The present invention relates to sound absorbing structures built into luggage compartments of vehicles.

The present application claims priority on Japanese Patent Application No. 2008-261015, the content of which is incorporated herein by reference.

2. Description of the Related Art

Various technologies for absorbing sound/noise entering into cabins of vehicles have been developed and disclosed in various documents such as Patent Documents 1 and 2, which disclose fibered mats and carpets for absorbing sound in trunks or boots.

Patent Document 1: Japanese Unexamined Patent Application Publication No. H11-99869

Patent Document 2: Japanese Patent No. 3836402

With the above technologies, it is difficult to attenuate or dampen low-frequency sound/noise below 500 Hz.

SUMMARY OF THE INVENTION

It is an object of the present invention to provide a sound absorbing structure which is built into a luggage compartment so as to efficiently absorb low-frequency sound/noise such as road noise (or running noise) caused by a vehicle traveling on a road.

The present invention is directed to a sound absorbing structure which is installed in a luggage compartment partitioned from a cabin in a vehicle and which is driven by sound pressure occurring in the luggage compartment so as to absorb low-frequency sound. It is preferable that the sound absorbing structure be positioned in the direction toward high sound pressure occurring in the luggage compartment.

It is possible to create various types of sound absorbing structures adaptable to the luggage compartment (or trunk) of a vehicle. A first sound absorbing structure is constituted of a vibration plate and an air layer formed in the rear side of the vibration plate. A second sound absorbing structure includes a plurality of pipes having openings and closing, which are positioned adjacent to each other. It is preferable that the pipes have cavities elongated between the opening and closings therein. It is preferable that the pipes have different lengths of cavities. A third sound absorbing structure serves as a Helmholtz sound absorbing structure which is constituted of a closed space and a pipe member, wherein the closed space communicates with the luggage compartment via the pipe member.

It is possible to equip the body of a vehicle with at least two of the first, second, and third sound absorbing structures, which are arbitrarily combined together.

In the above, the luggage compartment is formed in a vehicle separately to the cabin and is equipped with at least one sound absorbing structure that is driven by sound pressure so as to absorb low-frequency sound.

The sound absorbing structure of the present invention converts sound waves into vibrations so as to consume acoustic energy as mechanical energy, thus absorbing sound. By appropriately setting parameters and dimensions, the sound absorbing structure efficiently absorbs low-frequency noise such as road noise.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENT

The present invention will be described in further detail by way of examples with reference to the accompanying drawings.

1. First Embodiment (1-1) Vehicle

Figure 1:
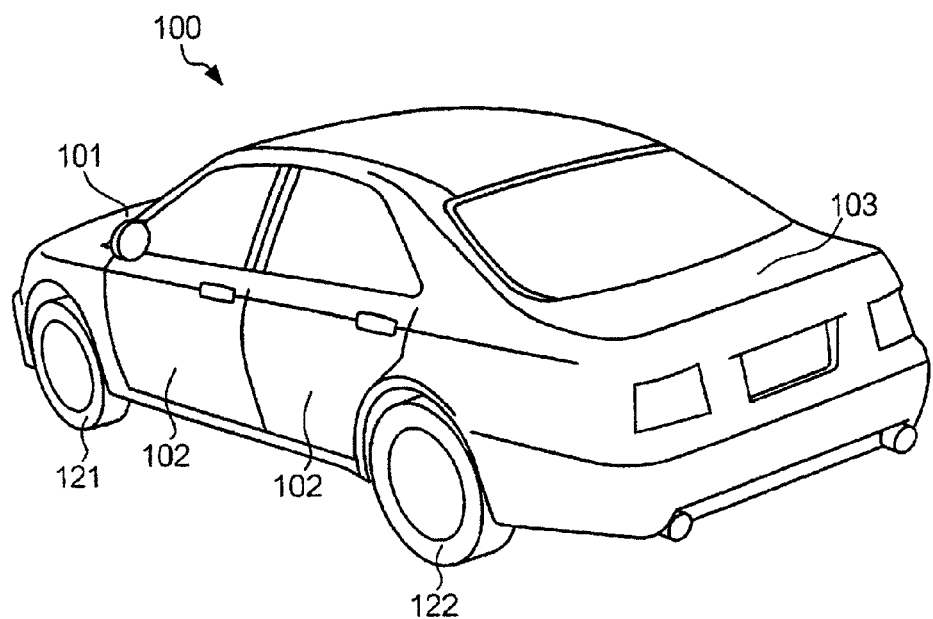
FIG. 1 is a perspective view showing the exterior appearance of a vehicle of a four-door sedan according to a first embodiment of the present invention.

FIG. 1 is a perspective view showing the exterior appearance of a vehicle 100, i.e. a four-door sedan, in accordance with a first embodiment of the present invention. In the vehicle 100, a hood 101, doors 102, and a trunk door 103 are attached to a chassis forming the frame of a body in open/closed manners. Left/right front wheels 121 are attached to the front side of the chassis, while left/right rear wheels 122 are attached to the rear side of the chassis.

Figure 2:
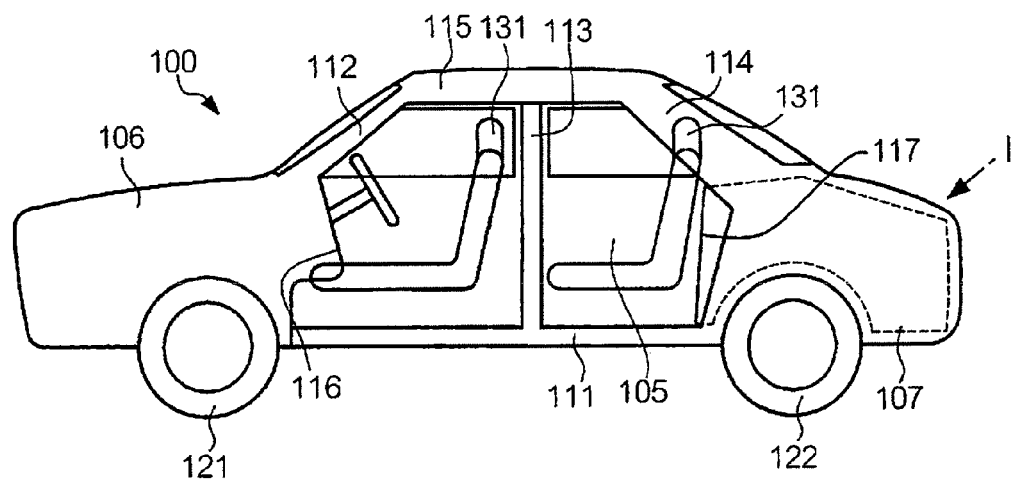
FIG. 2 is a side view partly in section showing the body of the vehicle shown in FIG. 1.

FIG. 2 is a side view partly in section diagrammatically showing the body of the vehicle 100. The chassis of the vehicle 100 includes a base 111, front pillars 112, center pillars 113, rear pillars 114 (wherein the pillars 112-114 are extended upwardly from the base 111), a roof 115 (which is supported by the pillars 112-114), an engine partition board 116 (which partitions the inside space of the vehicle 100 into a cabin 105 and an engine compartment 106), and a trunk partition board 117 (which partitions a luggage compartment or trunk 107 from the cabin 105). The cabin 105 is a compartment equipped with seats 131 accommodating a driver and passengers. The trunk 107 is arranged independently of the cabin 105 and is used as a space for storing luggage and the like. FIG. 2 shows that the trunk 107 corresponds to the space lying between the trunk partition board 117 and the tail end of the vehicle 100 just above the rear wheels 122.

(1-2) Trunk

Figure 3A:
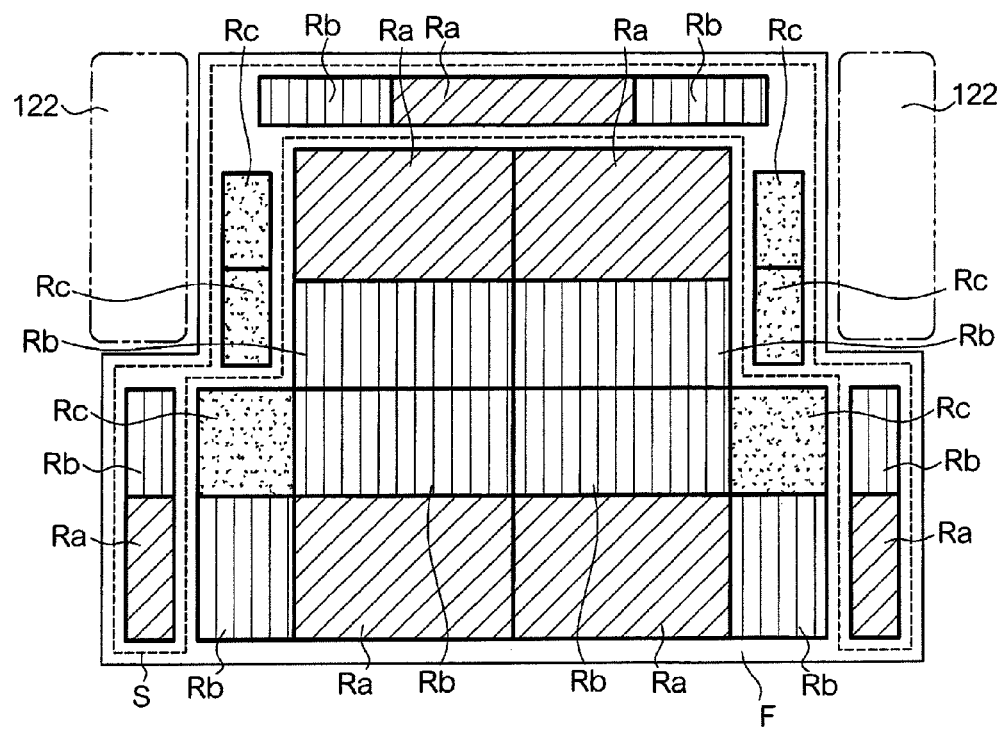
FIG. 3A is a plan view showing the upper portion of the trunk of the vehicle equipped with three types of sound absorbing structures having different sizes.
Figure 3B:
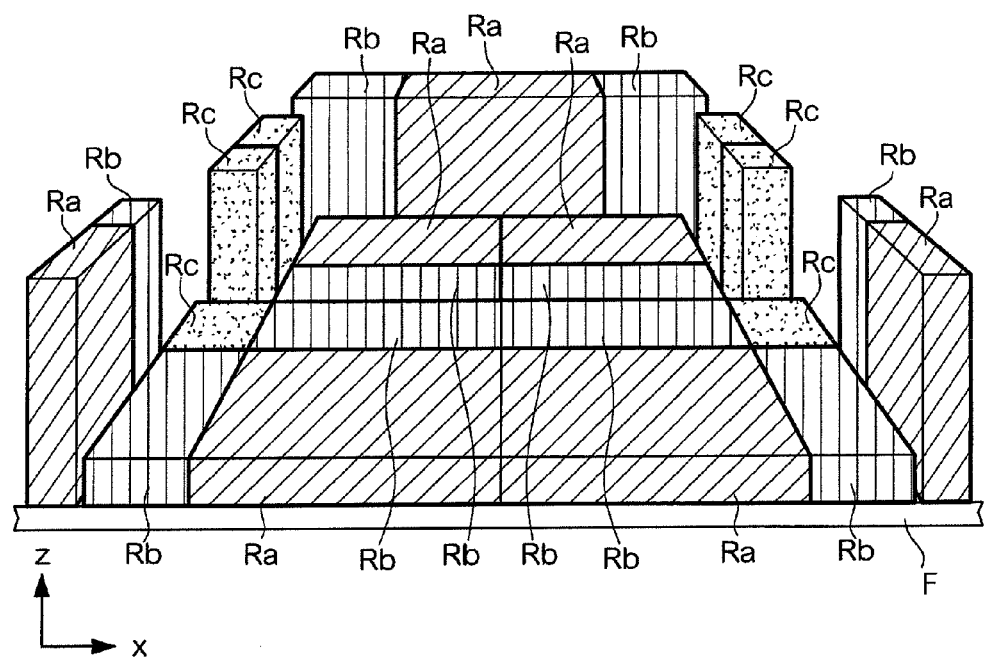
FIG. 3B is a perspective view of the trunk of the vehicle viewed in a direction I in FIG. 2.

The present embodiment is characterized by installing a sound absorbing structure in the trunk 107. FIG. 3A is a plan view showing the upper portion of the trunk 107, and FIG. 3B is a perspective view of the trunk 107 viewed in a direction I in FIG. 2. The trunk 107 is equipped with three types of plate-type sound absorbing structures 10 having different sizes as follows:

Sound absorbing structure 10a: 300 mm×300 mm×30 mm
Sound absorbing structure 10b: 300 mm×200 mm×30 mm
Sound absorbing structure 10c: 200 mm×200 mm×30 mm In FIGS. 3A and 3B, a trunk floor F is an interior surface of the trunk 107 of the vehicle 100, which is divided into various regions Ra, Rb, and Rc. Seven sound absorbing structures 10a are positioned in the regions Ra; ten sound absorbing structures 10b are positioned in the regions Rb; and six sound absorbing structures 10c are positioned in the regions Rc. In order to enhance sound absorption coefficients, the sound absorbing structures 10a, 10b, and 10c are each aligned in an upright manner (along the Z-axis direction) in the peripheral region of the trunk floor encompassed by a broken line S (see FIG. 3A) as shown in FIG. 3B. In order to secure a relatively large luggage space, the sound absorbing structures 10a, 10b, and 10c are aligned in a horizontal manner (along the X- and Y-axis directions) in the center region (inwardly of the peripheral region) in the trunk floor F. Since the sound absorbing structures 10a, 10b, and 10c are constituted of housings having different dimensions, they differ from each other in resonance frequencies. That is, the sound absorbing structures 10a-10c are allocated to the regions Ra-Rc of the trunk floor F to demonstrate desired resonance frequencies suited to sound pressure occurring therein. This broadens the range of resonance frequencies used in sound absorption so as to efficiently absorb sound in the trunk 107.

(1-3) Sound Absorbing Structure

The following description refers to the sound absorbing structures 10a-10c, each of which has the same structure but with different dimensions; hence, the sound absorbing structure 10a is selectively described with reference to FIGS. 4A and 4B.

Figure 4A:
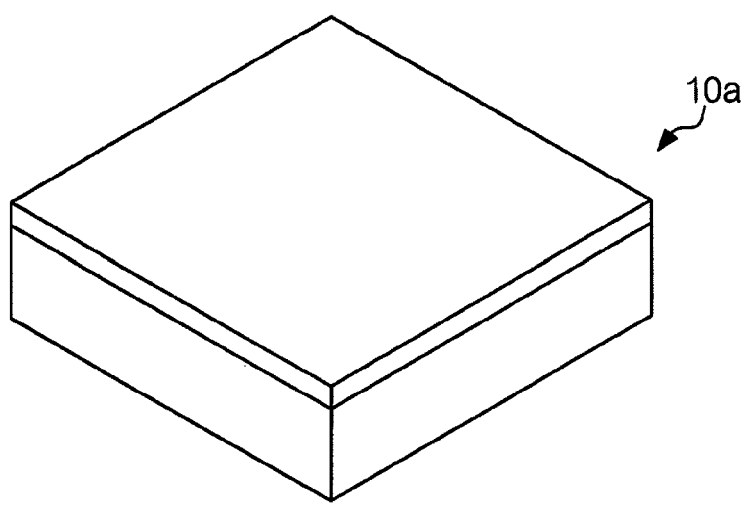
FIG. 4A is a perspective view showing the exterior appearance of a sound absorbing structure.
Figure 4B:
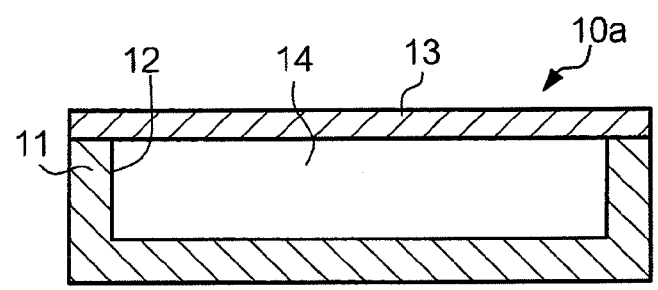
FIG. 4B is a cross-sectional view of the sound absorbing structure.

FIG. 4A is a perspective view of the sound absorbing structure 10a, and FIG. 4B is a cross-sectional view of the sound absorbing structure 10a. The sound absorbing structure 10a is constituted of a rectangular housing 11 having an opening 12, a vibration plate 13 closing the opening 12, and an air layer 14 formed inside the housing 11. The housing 11 is composed of a synthetic resin material (e.g. an ABS resin), while the vibration plate 13 is formed in a sheet shape composed of a high polymer compound (e.g. an olefin copolymer including a inorganic filler). Alternatively, the vibration plate 13 is formed in a film shape composed of an elastic material.

The sound absorbing structure 10 is subjected to prescribed conditions (which will be described below) so that the vibration plate 13 is driven due to a pressure difference between the sound pressure originating in the trunk 107 (and transmitted to the vibration plate 13) and the internal pressure of the air layer 14, in other words, the vibration plate 13 is driven by its front-back sound pressure difference. Thus, the energy of sound waves reaching the sound absorbing structure 10a is consumed by way of the vibration of the vibration plate 13, thus absorbing sound. That is, the sound absorbing structure 10a is acoustically driven to cause vibration, thereby demonstrating sound absorption.

(1-4) Conditions

The prescribed conditions set to the sound absorbing structure 10 will be described below.

In general, the attenuated frequency of a sound absorbing structure (which absorbs sound by means of a plate or film vibrator and an air layer) depends upon the resonance frequency of a spring-mass system constituted of the mass of the vibrator and the spring component of the air layer. The resonance frequency of the spring-mass system is given by Equation (1) using an air density $\rho_0$ [kg/m$^3$], sound velocity $c_0$ [m/s], a density $\rho$ [kg/m$^3$] of the vibrator, a thickness t [m] of the vibrator, and a thickness L [m] of the air layer.

$$f = \frac{1}{2\pi}\left\{\frac{\rho_0 c_0^2}{\rho t L}\right\}^{1/2} \quad (1)$$

In addition, the property of a bending system due to elastic vibration is additionally applied to a plate/film sound absorbing structure whose vibrator has elasticity causing the elastic vibration. In the field of architectural acoustics, the resonance frequency of the plate/film sound absorbing structure is given by Equation (2) using lengths a [m] and b [m] constituting the rectangular shape of the vibrator, the Young's modulus E [Pa] of the vibrator, the Poisson ratio $\sigma$ [−], and positive integers p, q, wherein it is used for an acoustic design supporting the periphery of the vibrator.

$$f = \frac{1}{2\pi}\left\{\frac{\rho_0 c_0^2}{\rho t L} + \left[\left(\frac{p}{a}\right)^2 + \left(\frac{q}{b}\right)^2\right]^2 \left[\frac{\pi^4 E t^3}{12\rho t(1-\sigma^2)}\right]\right\}^{1/2} \quad (2)$$

The present embodiment is designed to achieve sound absorption with respect to a frequency band ranging between 160 Hz and 315 Hz (e.g. a ⅓ octave center frequency) in accordance with the following parameters.

Air density $\rho_0$: 1.225 [kg/m$^3$]
Sound velocity $c_0$: 340 [m/s]
Density of vibrator $\rho$: 940 [kg/m$^3$]
Thickness of vibrator t: 0.0017 [m]
Thickness of air layer L: 0.03 [m]
Length of housing a: 0.3 [m]
Length of housing b: 0.3 [m]
Young's modulus of vibrator E: 1.0 [GPa]
Poisson ratio $\sigma$: 0.4
Mode number: p=1=1

Equation (2) adds the term representative of the bending system to the term representative of the spring-mass system (i.e. $\rho_0 c_0^2/\rho t L$), wherein the term of the bending system is the mathematical expression following just after the term of the spring-mass system. The resonance frequency of Equation (2) is higher than the resonance frequency of the spring-mass system of Equation (1), indicating a difficulty in lowering peak frequencies of sound absorption. The above sound absorption system is not adequately proved in terms of the relationship between the resonance frequency of the spring-mass system and the resonance frequency of the bending system (occurring due to elastic vibration of a plate/film having elasticity); hence, no sound absorbing structure is actually developed to demonstrate high sound absorption in a low-frequency range.

We the inventors vigorously study the property and characteristics of sound absorbing structures through experiments so as to reach a conclusion that the above parameters should be determined to meet Inequality (3) indicating the relationship between a fundamental frequency fa of the bending system and a fundamental frequency fb of the spring-mass system. This indicates that the fundamental vibration of the bending system cooperates with the spring component of the "rear" air layer so as to induce a large-amplitude vibration in a frequency band between the fundamental frequency of the spring-mass system and the fundamental frequency of the bending system (i.e. fa≦f≦fb, where f denotes the peak frequency of sound absorption), thus improving a sound absorption coefficient.

$$0.05 \leq fa/fb \leq 0.65 \quad (3)$$

It is possible to further lower the peak frequency of sound absorption compared to the resonance frequency of the spring-mass system by way of the setting of Inequality (4). Herein, an elastic vibration mode adequately lowers the fundamental frequency of the bending system compared to the resonance frequency of the spring-mass system, thus making the sound absorbing structure absorb sound whose frequency is lower than 300 [Hz].

$$0.05 \leq fa/fb \leq 0.40 \quad (4)$$

Setting various parameters satisfying Inequalities (3) and (4) lower peak frequencies of sound absorption in sound absorbing structures.

(1-5) Operation and Effect

According to the first embodiment, the sound absorbing structures 10 installed in the trunk 107 attenuates low-frequency sound/noise such as road noise due to friction of the rear wheels 122 of the vehicle 100 traveling on a road, thus markedly reducing noise transmitted to the seats 131 in the rear side of the cabin 105. Herein, the "low frequency" of sound/noise subject to attenuation lies between the fundamental frequency (e.g. about 80 Hz in a normal mode), which is the lowest frequency due to natural vibration of the trunk 107, and a frequency band (e.g. about 500 Hz or more in a normal mode) originating in a diffuse sound field of the trunk 107 presumably regarded as a discrete mode.

Figure 5:
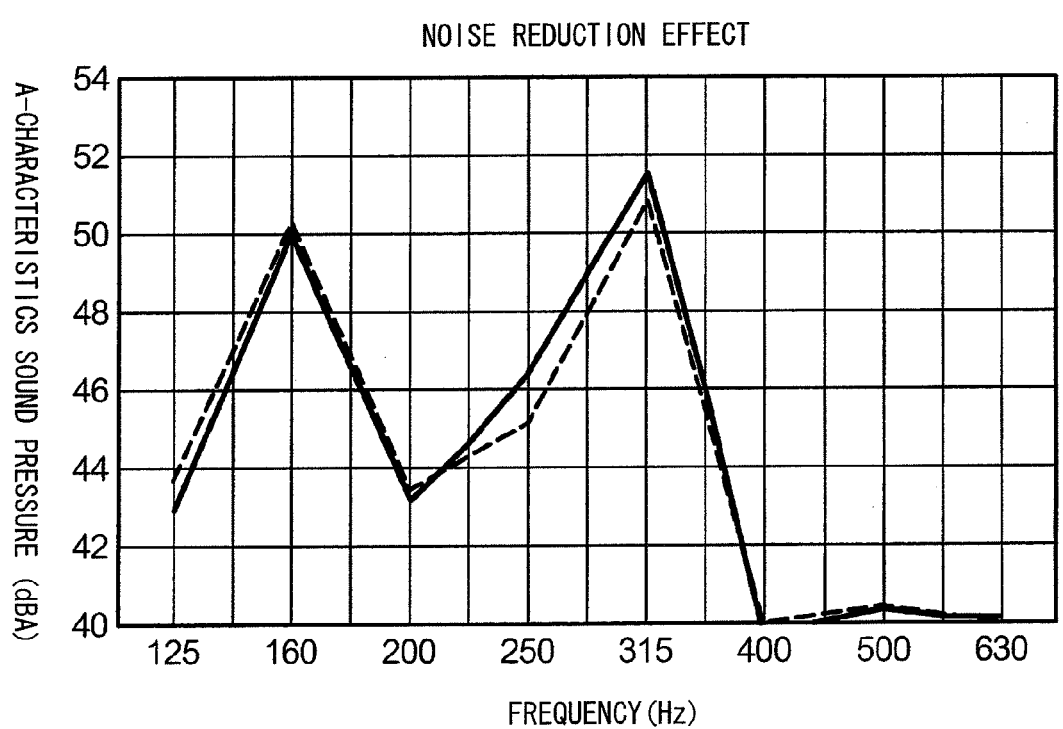
FIG. 5 is a graph showing experimental results regarding noise reduction effects due to sound absorbing structures installed in vehicles.

FIG. 5 is a graph showing experimental results regarding noise reduction effects in the trunk 107 incorporating sound absorbing structures. The graph of FIG. 5 shows the frequency characteristics of sound pressure occurring in left-rear seats in vehicles, wherein the solid line indicates the frequency characteristics of left-rear seats of vehicles having not sound absorbing structure, while the broken line indicates the frequency characteristics of left-rear seats of vehicles having sound absorbing structures. It explicitly shows that noise levels significantly get reduced in a specific frequency range between 250 Hz and 315 Hz, thus demonstrating an outstanding effect of sound absorption in a target frequency range in which road noise centralizes. In short, the body of the vehicle 100 of the first embodiment efficiently absorbs sound/noise such as road noise by means of the sound absorbing structures 10 installed in the trunk 107, thus improving the quietness in the cabin 105.

(1-6) Variations

It is possible to create variations and modifications of the first embodiment, which will be described below.

(a) First Variation

The first embodiment is designed to arrange the sound absorbing structures 10a-10c as shown in FIGS. 3A and 3B, whereas the arrangement and number of the sound absorbing structures 10a-10c are not necessarily limited as shown in FIGS. 3A and 3B. In short, the first embodiment simply stipulates that the sound absorbing structures 10 having different shapes and sizes be installed in the trunk 107.

(b) Second Variation

The first embodiment is modified such that the vibration plates 13 of the sound absorbing structures 10 are disposed on the trunk floor F of the trunk 107, alternatively, they are disposed toward the exterior panel of the trunk 107 forming the external appearance of the vehicle 100. The sound absorbing structures 10 whose vibration plates 13 are disposed on the trunk floor F of the trunk 107 absorb the internal sound indistinctively closed in the trunk 107; and the sound absorbing structures 10 whose vibration plates 13 are directed toward the exterior panel of the trunk 107 absorb the external sound which originates outside the vehicle 100 and enters into the trunk 107. Alternatively, it is possible to dispose the sound absorbing structures 10 toward the trunk floor F and the exterior panel of the trunk 107 respectively, thus absorbing both of the internal sound and the external sound in the trunk 107.

(c) Third Variation

The first embodiment employs the sound absorbing structure 10 encapsulating the air layer 14 inside the housing 11. In order to improve the rigidity of the vibration plate 13, it is possible to fill the housing 11 with open-cell resin foam such as polyurethane foam or cotton fibers such as felts and polyester wools. The first embodiment employs the sound absorbing structure 10 constituted of the rectangular housing 11, the vibration plate 13 closing the opening 12 of the housing 11, and the air layer 14 formed inside the housing 11; but this is not a restriction. For example, it is possible to form the housing 11 in any shapes such as circular shapes and polygonal shapes. Herein, it is preferable that the lumped mass (which is controlled to vary vibration conditions) is allocated to the center portion of the vibration plate 13 attached to the housing 11 having an arbitrary shape.

Since the sound absorbing structure 10 is characterized by the sound absorption mechanism consisting of the spring-mass system and the bending system, the present inventors have conducted various experiments on sound absorption coefficients at various resonance frequencies by varying surface densities of vibration plates attached to housings of sound absorbing structures encapsulating air layers.

Figure 6:
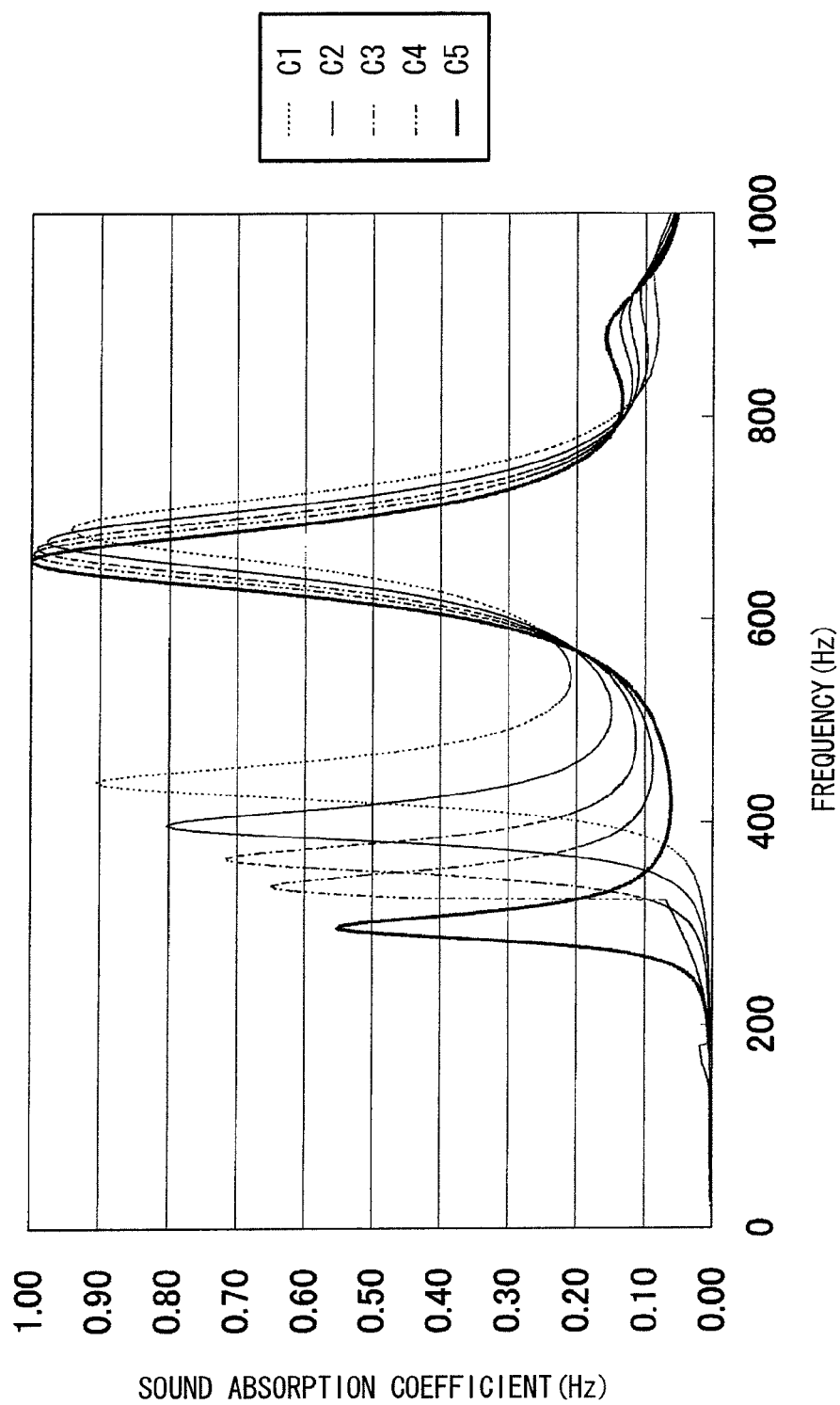
FIG. 6 is a graph showing simulation results on normal incidence sound absorption coefficients at various surface densities of center portions of vibration plates each attached to the housing of the sound absorbing structure encapsulating the air layer.

FIG. 6 is a graph showing simulation results on normal incidence sound absorption coefficients at various surface densities of center portions of vibration plates (where each center portion has an area of 20 mm×20 mm and a thickness of 0.85 mm, and each vibration plate has an area of 100 mm×100 mm and a thickness of 0.85 mm) each attached to a housing encapsulating an air layer having an area of 100 mm×100 mm and a thickness of 10 mm. Herein, the simulation is performed to calculate sound absorption coefficients by use of transfer functions which are applied to the sound field of a sound chamber locating the above sound absorbing structure and are determined by the finite element method in accordance with JIS A 1405-2 (i.e. the Japanese Industrial Standard on the measurement of sound absorption coefficients and impedances in sound tubes, part 2: transfer function method). FIG. 6 shows five characteristic curves C1 to C5 calculated using the same surface density of vibration plates (i.e. 799 g/m$^2$) but different surface densities of center portions of vibration plates (i.e. C1: 399.5 g/m$^2$, C2: 799 g/m$^2$, C3: 1199 g/m$^2$, C4: 1598 g/m$^2$, and C5: 2297 g/m$^2$), and thus different average densities of vibration plates (i.e. C1: 783 g/m$^2$, C2: 799 g/m$^2$, C3: 815 g/m$^2$, C4: 831 g/m$^2$, and C5: 863 g/m$^2$).

The simulation results of FIG. 6 explicitly shows that sound absorption coefficients peak at a frequency of 300-500 Hz and another frequency of about 700 Hz. Sound absorption coefficients peak at the frequency of about 700 Hz due to the resonance of the spring-mass system consisting of the mass of the vibration plate 13 and the spring component of the air layer 4. The sound absorbing structure 10 is designed to achieve a peak sound absorption coefficient at the resonance frequency of the spring-mass system. The graph of FIG. 6 shows that the resonance frequency of the spring-mass system does not significantly vary since the total mass of the vibration plate 13 does not significantly vary irrespective of increasing the surface density of the center portion of the vibration plate 13. Sound absorption coefficients peak at the frequency of 300-500 Hz due to the resonance of the bending system caused by the bending vibration of the vibration plate 13. In the sound absorbing structure 10, the sound absorption coefficient peaks due to the resonance frequency of the bending system in a low frequency range, wherein the graph of FIG. 6 shows that the resonance frequency of the bending system decreases as the surface density of the center portion of the vibration plate 13 increases.

In general, the resonance frequency of the bending system depends upon equations of motion dominating the elastic vibration of the vibration plate 13 and is inversely proportional to the surface density of the vibration plate 13, wherein it is greatly affected by the surface density at the antinode of the natural vibration (at which the amplitude becomes maximal). The above simulation is performed by realizing the antinode of 1×1 natural mode using the center portion of the vibration plate 13 which is varied in surface density, so that the resonance frequency of the bending system is varied. The simulation results of FIG. 6 show that as the surface density of the center portion of the vibration plate 13 increases in comparison with the surface density of the peripheral portion of the vibration plate 13, the peak sound absorption coefficient of the lower range of frequency moves in a further lower range of frequency. This demonstrates that varying the surface density of the center portion of the vibration plate 13 shifts the peak sound absorption coefficient in a further lower range of frequency of in a further higher range of frequency.

Since the sound absorbing structure 10 is designed to shift the peak frequency of sound absorption by simply varying the surface density of the center portion of the vibration plate 13. Compared to the conventional sound absorbing structure in which the vibration plate is composed of the same material as the housing and whose weight is increased to vary the sound absorption frequency, the sound absorbing structure 10 of the present embodiment is advantageous because it is appropriately designed to decrease the sound absorption frequency without greatly varying the total weight thereof. That is, the present embodiment is adapted to variations of noise characteristics inside vehicles due to variations of sound absorption in cabins and trunks (e.g. the varying number of persons and luggage in vehicles, and various shapes of cabins and trunks) and due to variations of noise originating inside/outside vehicles (e.g. changes of tires, variations of road conditions). It is possible to further improve sound absorption coefficients using porous sound absorbing materials (e.g. resin foams, and cotton fibers such as felts and polyester wools) filled in the air layer 14 of the sound absorbing structure 10.

2. Second Embodiment

A sound absorbing structure according to a second embodiment of the present invention will be described with reference to FIGS. 7A and 7B, and FIGS. 8 and 9. The second embodiment is characterized by employing pipes as sound absorbing structures installed in the trunk 107 of the vehicle 100. The parts identical to those used in the first embodiment are designated by the same reference numerals, thus avoiding duplicate descriptions.

(2-1) Constitution

Figure 7A:
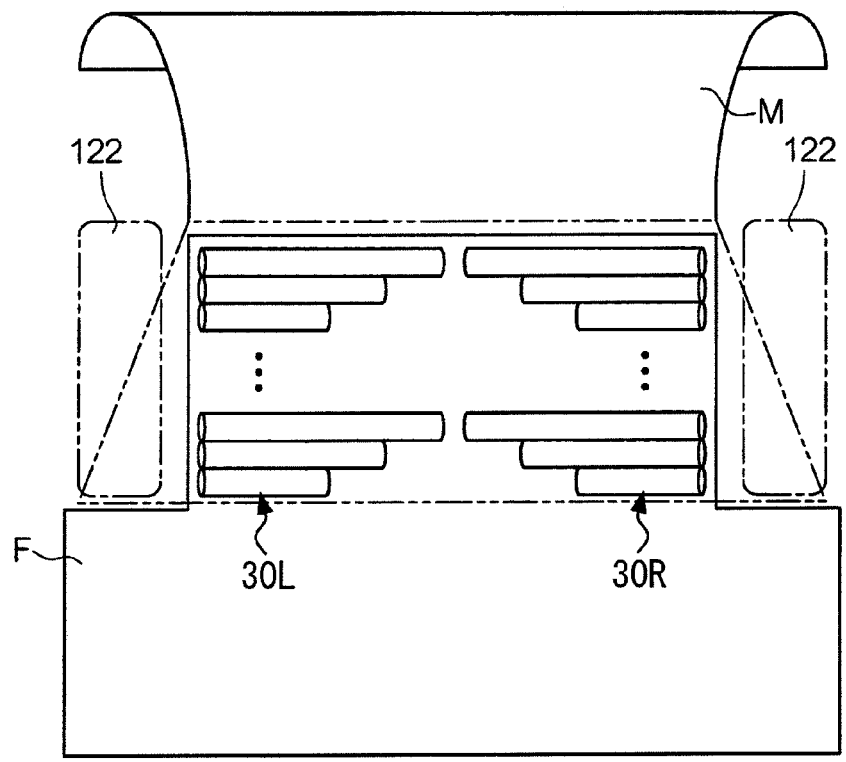
FIG. 7A is a plan view showing the upper portion of the trunk equipped with sound absorbing structures according to a second embodiment of the present invention.
Figure 7B:
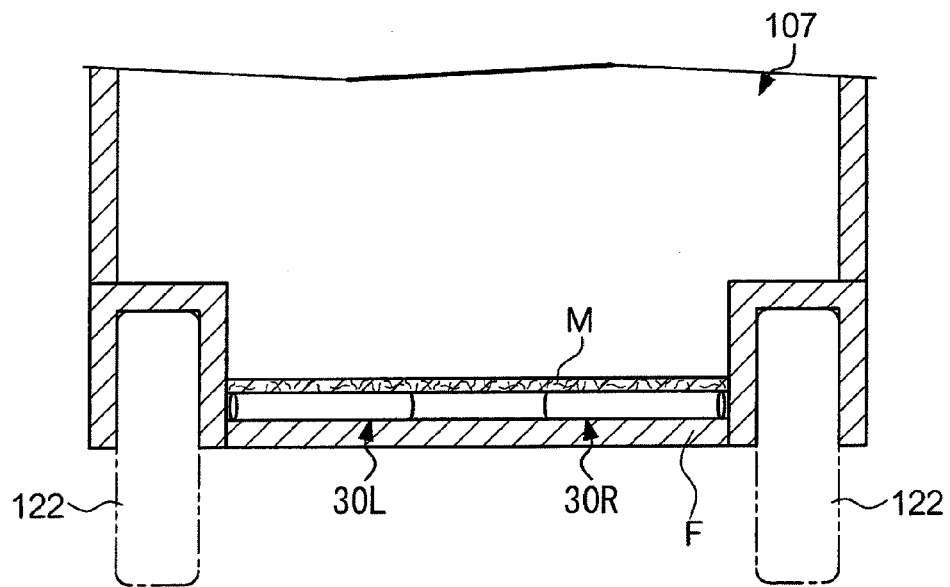
FIG. 7B is a cross-sectional view of the trunk shown in FIG. 7A.

FIG. 7A is a plan view showing the upper portion of the trunk 107, and FIG. 7B is a cross-sectional view of the trunk 107. A trunk floor mat M composed of an air-permeable material is laid on the trunk floor F of the trunk 107. FIG. 7A is a simplified illustration showing the trunk floor F below the trunk floor mat M which is removed, whereas, in actuality, the trunk floor mat M is tightly laid on the trunk floor F. Two sound absorbing structures 30 (i.e. 30L and 30R) each including a plurality of pipes are laid in the space between the trunk floor F and the trunk floor mat M, wherein they are normally covered with the trunk floor mat M and are invisible in the trunk 107. The pipes of the sound absorbing structures 30L and 30R are disposed such that the openings thereof are directed toward the rear wheels 122 causing high sound pressure.

Figure 8:
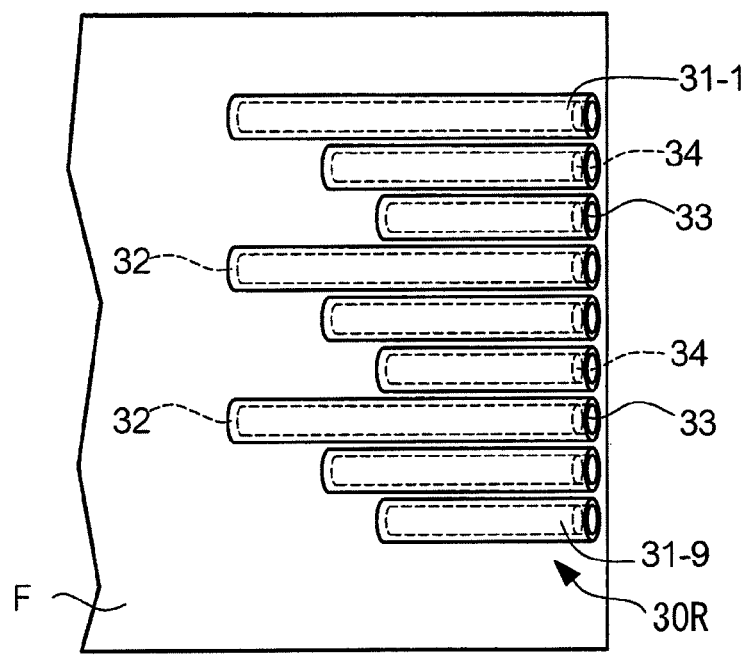
FIG. 8 is a plan view partly in section showing nine pipes having openings and closings which constitute each of the sound absorbing structure shown in FIGS. 7A and 7B.

Next, the details of the sound absorbing structures 30L and 30R will be described. Since both the sound absorbing structures 30L and 30R have the same structure, the sound absorbing structure 30R is exemplarily described with reference to FIGS. 8 and 9. As shown in FIG. 8, nine pipes 31 (i.e. pipes 31-1 to 31-9) having different lengths are linearly aligned and unified together such that they are mutually interconnected together or they are interconnected together via specific parts. Each pipe 31 is a linear rigid pipe (having a circular cross section) composed of a synthetic resin with a prescribed thickness (e.g. about 2 mm) and a prescribed internal diameter (e.g. about 60 mm). One end of each pipe 31 is closed to form a closing 32, while the other end is opened to form an opening 33. The openings 33 of the pipes 31 are linearly aligned and positioned adjacent to each other.

The pipes 31 have respective lengths each corresponding to a quarter of the wavelength corresponding to the center frequency of sound waves absorbed by the cavity of each pipe 31. The second embodiment prepares three types of pipes 31 with cavity lengths L at 0.85 m, 0.68 m, and 0.53 m, thus absorbing sound at center frequencies (i.e. ⅓ octave band pitches) of 100 Hz, 125 Hz, and 160 Hz (where the sound velocity is 340 m/s). The neck portions of the openings 33 of the pipes (i.e. the proximate portions of the openings 33) are closed with flow resistance members 34 composed of sound-pressure permeable materials such as glass wool, cloth, and gauze.

(2-2) Operating Principle

Figure 9:
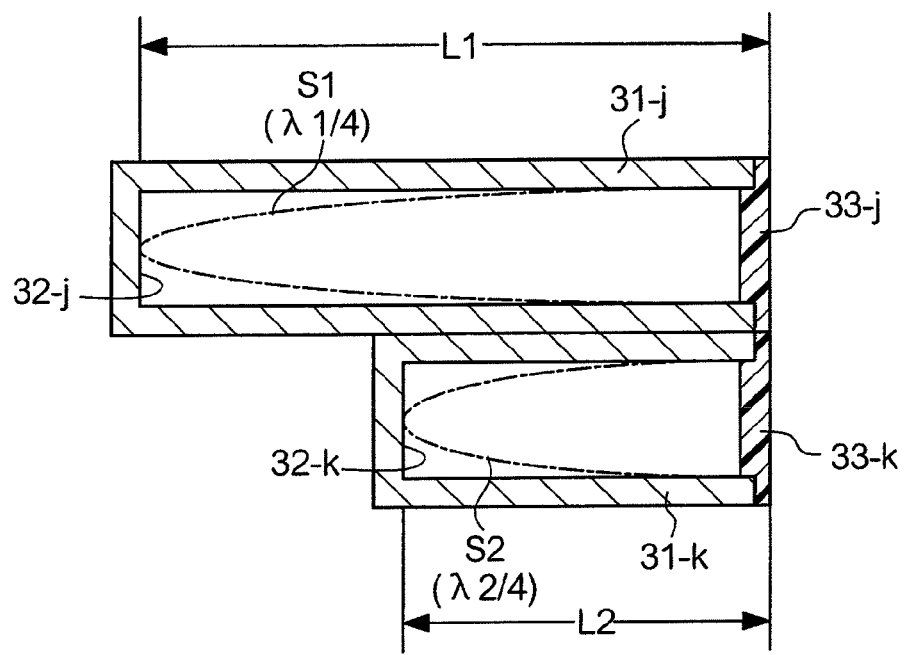
FIG. 9 is a cross-sectional view used for explaining the operating principle of adjacent pipes absorbing sound.

Next, the operating principle of the sound absorbing structure 30R including the pipes 31 will be described with reference to FIG. 9, which shows two adjacent pipes 31-$j$ and 31-$k$ within the sound absorbing structure 30. The pipes 31-$j$ and 31-$k$ have cavities of lengths L1 and L2, closings 32-$j$ and 32-$k$, and openings 33-$j$ and 33-$k$ respectively. Sound waves occurring in the cabin 105 are led into the cavities of the pipes 31-$j$ and 31-$k$ via the openings 33-$j$ and 33-$k$, wherein they are reflected at the closings 32-$j$ and 32-$k$ and are then emitted outside via the openings 33-$j$ and 33-$k$. Sound waves of wavelengths λ1 and λ2 corresponding to four times the lengths L1 and L2 (where L1=λ1/4, L2=λ2/4) form standing waves S1 and S2, the energy of which is consumed due to friction on interior walls of cavities and the viscosities of air particles at the openings 33-$j$ and 33-$k$ since the pipes 31-$j$ and 31-$k$ repeatedly vibrate, thus absorbing sound centralized at the wavelengths λ1 and λ2. In the case of L1=1.35 m, L2=0.53 m, λ1=5.4 m, and λ2=2.12 m, sound waves are absorbed at center frequencies f1=63 Hz and f2=160 Hz.

Sound waves, which are reflected at the closings 32-j and 32-k and then emitted from the openings 33-j and 33-k, are diffracted at the openings 33-j and 33-k so as to emit energy. Energy emitted from the openings 33-j and 33-k of the pipes 31-j and 31-k is partially incident at the opposite openings 33-k and 33-j of the pipes 31-k and 31-j. That is, energy is exchanged between the adjacent pipes 31-j and 31-k due to their coupled oscillations, during which energy is consumed due to friction on interior walls of cavities and viscosities of air particles at the openings 33-j and 33-k, thus achieving sound absorption. Coupled oscillations are grasped as a both-ends-closed-pipe mode in which the adjacent pipes 31-j and 31-k are united together to form a single pipe that absorbs sound centralized at a certain wavelength λ3 (where L1+L2=λ3/2), for example. In the case of L1=1.35 m, L2=0.53 m, and λ3=3.76 m, sound waves are absorbed due to coupled oscillations centralized at a frequency f3 (where f3=90 Hz), for example. Table 1 shows coupled oscillation frequencies occurring between adjacent pipes in the sound absorbing structure of FIG. 8 including the nine pipes 31-1 to 31-9 (absorbing sounds centralized at the prescribed frequencies of 100 Hz, 125 Hz, and 160 Hz), which collectively achieve averaged sound absorption in a frequency range between 100 Hz and 160 Hz.

TABLE 1

| L1 (m) | L2 (m) | Coupled Oscillation Frequency (Hz) |
|---|---|---|
| 0.85 | 0.68 | 111 |
| 0.85 | 0.53 | 123 |
| 0.68 | 0.53 | 140 |

(2-3) Operation and Effect

The sound absorbing structures 30 including the pipes 31 are installed in the trunk 107 so as to efficiently absorb sound/noise, in particular, low-frequency noise such as road noise occurring due to friction between tires and roads, thus improving the quietness in the cabin 105. Since the sound absorbing structures 30 are embedded in the space between the trunk floor F and the trunk floor mat M so that they are invisible in the trunk 107, they do not damage the interior design and appearance of the trunk 107.

(2-4) Variations

It is possible to create variations and modifications of the second embodiment, which will be described below.

(a) First Variation

The second embodiment is characterized by the sound absorbing structures 30 including the pipes 31, which are arranged between the trunk floor F and the trunk floor mat M in the trunk 107 as shown in FIGS. 7A and 7B; but the number and arrangement of the sound absorbing structures 30 as well as the directions of the openings 33 are not necessarily limited to those shown in FIGS. 7A and 7B. In short, the second embodiment stipulates that the openings 33 of the pipes 31 are directed toward high sound pressure.

(b) Second Variation

The sound absorbing structure 30 employs the "closed" pipes 31 having the closings 32 opposite to the openings 33; but this is not a restriction. It is possible to employ "open" pipes having openings at both ends; alternatively, it is possible to blend closed pipes and open pipes.

3. Third Embodiment

A third embodiment of the present invention will be described with reference to FIG. 10, wherein parts identical to those of the first embodiment are designated by the same reference numerals, thus avoiding duplicate descriptions.

The third embodiment features a Helmholtz sound absorbing structure 40, which is disposed on the trunk floor F of the trunk 107 and which is opened toward the rear wheel 122 causing high sound pressure similar to the sound absorbing structure 30 including the pipes 31 whose openings 33 are directed to the rear wheel 122.

Figure 10:
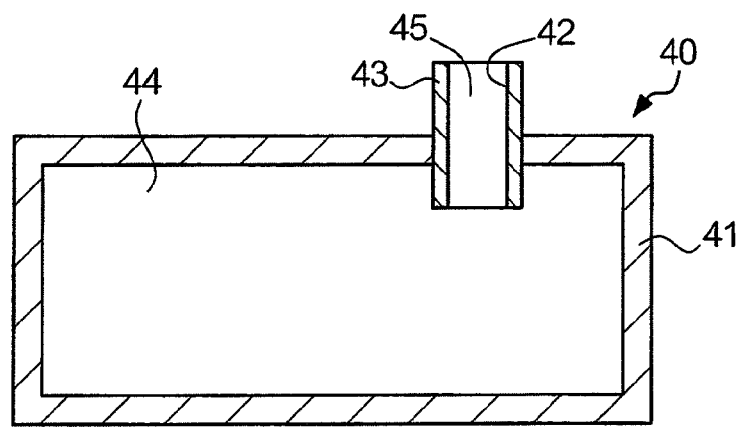
FIG. 10 is a cross-sectional view showing a Helmholtz sound absorbing structure according to a third embodiment of the present invention.

FIG. 10 is a cross-sectional view of the Helmholtz sound absorbing structure 40 according to the third embodiment of the present invention. The Helmholtz sound absorbing structure 40 is constituted of a housing 41 having a rectangular parallelepiped shape enclosing a hollow space and a pipe member 43 inserted into an insertion hole 42 made on the housing 41 at a prescribed position directing toward the trunk 107. A closed space 44 is formed inside the housing 41, and an opening 45 is formed inside the pipe member 43 so as to make the closed space 44 communicate with the trunk 107. The housing 41 is formed in the rectangular parallelepiped shape composed of fiber reinforced plastics (FRP). The shape of the Helmholtz sound absorbing structure 40 is not necessarily limited to the rectangular parallelepiped and can be formed in other shapes such as cylindrical shapes. The pipe member 43 is composed of a vinyl-chloride pipe whose interior surface is roughened so as to cause air friction, for example. The air in the closed space 44 (which is a small cavity) serves as a spring in the Helmholtz sound absorbing structure 40, thus attenuating sound in the trunk 107. Since the small opening 45 of the closed space 44 communicates with the trunk 107, the Helmholtz sound absorbing structure 40 serves as a single-point spring-mass system in which the air of the opening 45 serves as a lumped mass. Due to the resonance occurring in the spring-mass system, the lumped air of the opening 45 vibrates due to sound pressure of the trunk 107 so as to cause friction with the surrounding wall of the opening 45 (i.e. the pipe member 43), thus converting sound energy into thermal energy, i.e. attenuating sound.

A resonance frequency f0 of the Helmholtz sound absorbing structure 40 is given by Equation (5) using the length L of the opening 45, the cross-sectional area S of the opening 45, the volume V of the closed space 44, the sound velocity C, and the effective length Le of the opening 45 (where Le=L+0.8×S1/2).

$$f0 = \frac{1}{2\pi}\sqrt{\frac{c^2 \times S}{Le \times V}} = \left(\frac{1}{2\pi}\right) \times \left[\frac{c^2 \times S}{Le \times V}\right]^{1/2} \qquad (5)$$

Equation (5) shows that the resonance frequency f0 is adjusted by changing the cross-sectional area S and/or the effective length Le of the opening 45, in other words, by changing the internal diameter d and/or the length L of the pipe member 43. This proves that the Helmholtz sound absorbing structure 40 is capable of attenuating sound.

When the Helmholtz sound absorbing structure 40 is attached to the door 102, it efficiently absorbs low-frequency sound/noise such as road noise caused by friction of the rear wheels 122 due to tires traveling on a road.

4. Variations

The present invention is described by way of the first, second, and third embodiments, which are not restrictions and which can be further modified in various ways.

(a) First Variation

The aforementioned embodiments are each designed to use one of the different types of the sound absorbing structures 10, 30, and 40; but this is not a restriction. It is possible to simultaneously use the two types of the sound absorbing structures 10 and 30, which will further improve sound absorption coefficients. The combination of different types of sound absorbing structures is not necessarily limited to the combination of the sound absorption structures 10 and 30. That is, it is possible to employ the combination of the sound absorbing structures 10, 30, and 40 or the combination of the sound absorbing structures 30 and 40.

(b) Second Variation

The aforementioned embodiments are each applied to the vehicle 100 in which the trunk partition board 117 partitions between the cabin 105 and the trunk 107; but the trunk 107 is not necessarily limited to this structure. For example, the cabin 105 is portioned from the trunk 107 by use of a detachable rear package.

Figure 11:
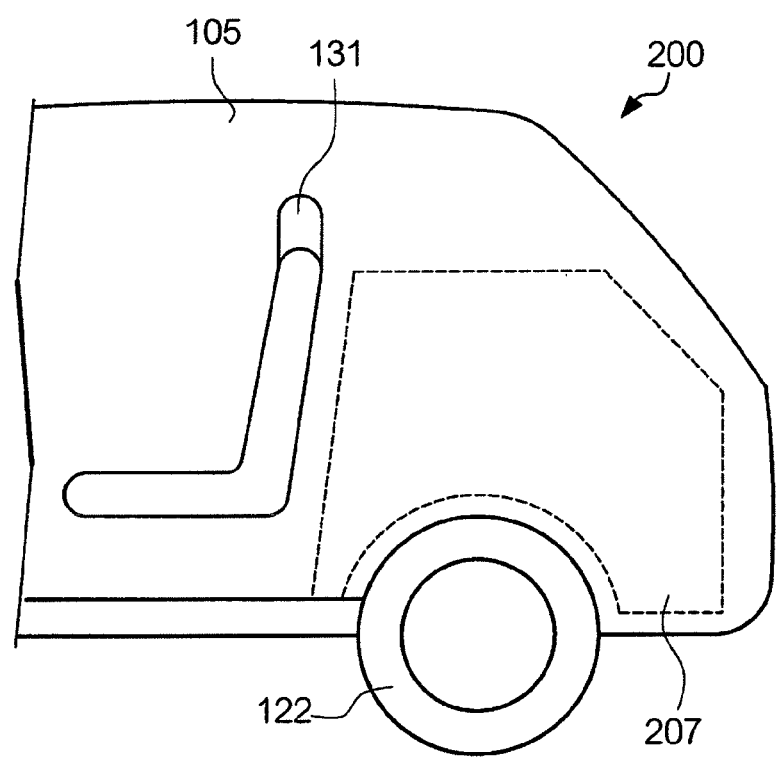
FIG. 11 is a side view partly in section diagrammatically showing the rear portion of a hatchback vehicle adopting the sound absorbing structure according to the present invention.

The aforementioned embodiments are each applied to the vehicle 100 of the four-door sedan, wherein the sound absorbing structures are installed in the trunk 107; but this is not a restriction. That is, the present invention is applicable to a vehicle 200 of a hatchback type shown in FIG. 11, wherein the sound absorbing structures are installed in a trunk 207 which is not a closed space partitioned using the trunk partition board 117 and which is an open space communicating with the cabin 105.

Lastly, the present invention is not necessarily limited to the aforementioned embodiments and variations, which can be further modified in various ways within the scope of the invention as defined by the appended claims.

What is claimed is:

1. A sound absorbing structure which is installed in a luggage compartment partitioned from a cabin in a vehicle, the sound absorbing structure comprising a plurality of panel sound absorbers, each of said sound absorbers comprising:
    a housing having an opening;
    a vibration plate disposed on said housing and closing said opening, said housing and said vibration plate forming an enclosed air layer; and
    wherein the plurality of panel sound absorbing structures are responsive to sound pressure occurring in the luggage compartment so as to absorb a plurality of frequencies of sound, and
    wherein at least one of the plurality of panel sound absorbers satisfies the relationship of fa<f<fb, where fa is the fundamental frequency of a bending system of the vibration plate, f is a sound-absorption peak frequency and fb is a fundamental frequency of a spring-mass system of the enclosed air layer.

2. The sound absorbing structure according to claim 1, wherein the sound absorbing structure is positioned in a direction toward high sound pressure occurring in the luggage compartment.

3. The sound absorbing structure according to claim 1, further comprising a plurality of pipes positioned adjacent to each other.

4. The sound absorbing structure according to claim 3, wherein one end of each of the pipes is open and the other end is closed.

5. The sound absorbing structure according to claim 3, wherein the pipes have different lengths of cavities.

6. The sound absorbing structure according to claim 1, further comprising a plurality of a Helmholtz sound absorbing structures.

7. The sound absorbing structure according to claim 1, wherein the panel sound absorbers have different sizes.

8. The sound absorbing structure according to claim 1, wherein at least one of the plurality of panel sound absorbers satisfies the relationship of $0.05 \leq fa/fb \leq 0.65$.

9. The sound absorbing structure according to claim 1, wherein the surface density of a center portion of the vibration plate differs from the surface density of a peripheral portion of the vibration plate.

10. A sound absorbing structure that is installed in a luggage compartment in the body of a vehicle, comprising:
    a plurality of first sound absorbing panels, each constituted of a housing having an opening, a vibration plate disposed on said housing and closing said opening, said housing and said vibration plate forming an enclosed air layer, wherein the plurality of first sound absorbing panels have a plurality of resonant frequencies; and
    at least one of:
    a second sound absorbing structure including a plurality of pipes having openings and closings, and
    a third sound absorbing structure serving as a Helmholtz sound absorbing structure including a closed space and a pipe member.

11. A luggage compartment which is formed in a vehicle separately to a cabin and which is equipped with at least one sound absorbing structure, the sound absorbing structure comprising a plurality of panel sound absorbers, each of said panel sound absorbers comprising:
    a housing having an opening;
    a vibration plate disposed on said housing and closing said opening, said housing and said vibration plate forming an enclosed air layer; and
    wherein the plurality of sound absorbing structures are responsive to sound pressure so as to absorb a plurality of frequencies of sound in the luggage compartment, and
    wherein at least one of the plurality of panel sound absorbers satisfies the relationship of fa<f<fb, where fa is the fundamental frequency of a bending system of the vibration plate, f is a sound-absorption peak frequency and fb is a fundamental frequency of a spring-mass system of the enclosed air layer.

12. The luggage compartment according to claim 11, wherein at least one of the plurality of panel sound absorbers satisfies the relationship of $0.05 \leq fa/fb \leq 0.65$.

\* \* \* \* \*